(12) United States Patent
Albrecht et al.

(10) Patent No.: US 9,138,825 B2
(45) Date of Patent: Sep. 22, 2015

(54) WIRELESS COMMUNICATION SYSTEM FOR WELDING-TYPE DEVICES

(75) Inventors: Bruce Albrecht, Grayslake, IL (US); James F. Ulrich, Grayslake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1399 days.

(21) Appl. No.: 11/163,161

(22) Filed: Oct. 7, 2005

(65) Prior Publication Data

US 2007/0080149 A1    Apr. 12, 2007

(51) Int. Cl.
*B23K 9/10*     (2006.01)
*B23K 9/32*     (2006.01)
*G05B 19/4063*  (2006.01)

(52) U.S. Cl.
CPC ... *B23K 9/32* (2013.01); *B23K 9/10* (2013.01); *B23K 9/1087* (2013.01); *G05B 19/4063* (2013.01)

(58) Field of Classification Search
CPC .............. B23K 9/10; H04Q 5/22; H04B 7/14; H04B 7/145; G08B 13/14; G08B 1/08; G06F 17/00
USPC ........... 219/130.01, 132, 137.71; 340/539.13, 340/539.17, 531
See application file for complete search history.

(56) References Cited

U.S. PATENT DOCUMENTS

| | | |
|---|---|---|
| 5,500,512 A | 3/1996 | Goldblatt |
| 5,553,810 A | 9/1996 | Bobeczko |
| 5,692,700 A | 12/1997 | Bobeczko |
| 6,091,048 A | 7/2000 | Lanouette et al. |
| 6,248,975 B1 | 6/2001 | Lanouette et al. |
| 6,267,291 B1 | 7/2001 | Blankenship et al. |
| 6,459,989 B1 | 10/2002 | Kirkpatrick et al. |
| 6,510,984 B2 | 1/2003 | Blankenship et al. |
| 6,536,660 B2 * | 3/2003 | Blankenship et al. ........ 235/375 |
| 6,552,303 B1 | 4/2003 | Blankenship et al. |
| 6,563,085 B2 | 5/2003 | Lanouette et al. |
| 6,708,877 B2 | 3/2004 | Blankenship et al. |
| 6,710,299 B2 | 3/2004 | Blankenship et al. |

(Continued)

FOREIGN PATENT DOCUMENTS

| | | |
|---|---|---|
| DE | 19654122 C1 | 1/1998 |
| DE | 10058301 A1 | 5/2002 |

(Continued)

OTHER PUBLICATIONS

Fuhr et al., *Putting Sensors to Work* "Mesh Radio Network Performance in Cargo Containers," *Sensors*, Mar. 2005, pp. 13-17 and 18, www.sensorsmag.com.

(Continued)

*Primary Examiner* — Brian Jennison
(74) *Attorney, Agent, or Firm* — Fletcher Yoder P.C.

(57) ABSTRACT

A welding-type device has wireless communications to transmit wireless signals comprising at least identification information or location information. The information may be transmitted either automatically or in response to request signals. Such a welding-type device may be configured to communicate with other welding-type devices, a monitoring device, or both. A wireless communication system has at least one welding-type device, at least one wireless communication assembly, and at least one monitoring device and is capable of assisting a user in locating particular welding-type devices, preventing theft of welding-type devices, and scheduling preventive maintenance.

19 Claims, 5 Drawing Sheets

(56) References Cited

U.S. PATENT DOCUMENTS

| | | | |
|---|---|---|---|
| 6,728,619 B2 * | 4/2004 | Adachi et al. | 701/50 |
| 6,849,826 B2 | 2/2005 | Hayes | |
| 6,852,949 B2 | 2/2005 | Lanouette et al. | |
| 7,032,814 B2 | 4/2006 | Blankenship | |
| 2002/0119770 A1 * | 8/2002 | Twitchell, Jr. | 455/422 |
| 2002/0168937 A1 | 11/2002 | Clark | |
| 2003/0094487 A1 | 5/2003 | Blankenship et al. | |
| 2003/0141973 A1 * | 7/2003 | Yeh et al. | 340/539.13 |
| 2003/0160037 A1 | 8/2003 | Hayes | 219/130.5 |
| 2003/0210140 A1 * | 11/2003 | Menard et al. | 340/531 |
| 2004/0000498 A1 | 1/2004 | Weissbrod | |
| 2004/0026392 A1 * | 2/2004 | Feichtinger et al. | 219/130.5 |
| 2005/0110636 A1 | 5/2005 | Ghaffari | |
| 2005/0145688 A1 | 7/2005 | Milenkovic | |
| 2005/0275531 A1 | 12/2005 | Johnson | |
| 2006/0022867 A1 | 2/2006 | Hessing | |
| 2006/0070987 A1 | 4/2006 | Daniel | |
| 2006/0071782 A1 | 4/2006 | Ahmed et al. | |
| 2006/0173619 A1 | 8/2006 | Brant et al. | |

FOREIGN PATENT DOCUMENTS

| | | |
|---|---|---|
| EP | 0852986 A1 | 7/1998 |
| EP | 1229343 A1 | 8/2002 |
| EP | 1681122 A1 | 7/2006 |
| JP | H08335238 | 12/1996 |
| JP | H10164676 | 6/1998 |
| JP | 10305366 A | 11/1998 |
| JP | 3019016 | 3/2000 |
| JP | 2002032880 | 1/2002 |
| JP | 2003317055 | 11/2003 |
| JP | 2004334439 | 11/2004 |
| WO | WO0207014 A1 | 1/2002 |
| WO | 0247860 A1 | 6/2002 |
| WO | 02085566 A1 | 10/2002 |
| WO | 02086656 | 10/2002 |
| WO | WO2007044135 A1 | 4/2007 |

OTHER PUBLICATIONS

Fuhr et al., "The Realities of Dealing with Wireless Mesh Networks," 7 pages.

Ke et et al., "Discovery of Directional Communication Channels in Ad Hoc Networks," 2 pages.

"Unidex's Lean, mean assembly machine", *MRO Today*, Jun./Jul. 2005, pp. 11-12, www.mrotoday.com.

"What is RFID?", http://www.rfidjournalcom/article/articleview/1339/1/129/, 5 pages.

Rogers, "DME Basics", http://www.avweb.com/news/avionics/183230-1.html, 3 pages.

* cited by examiner

WIRELESS COMMUNICATION SYSTEM FOR WELDING-TYPE DEVICES

BACKGROUND OF THE INVENTION

The present invention relates generally to welding-type devices, and more specifically, to an apparatus and system for wirelessly identifying, locating, and/or monitoring the status of remote welding-type devices located at a job site or in storage.

As is well known in the industry, welding-type equipment can be employed in a large variety of vastly differing work sites. For example, such equipment is used in environments like small or large workshops, factories, construction sites, and expansive manufacturing yards such as ship building yards. The number of welding-type devices in use can range from one to several thousand, and can include any combination of welders, plasma cutters, induction heaters, and the like, all at one site. Furthermore, the materials, accessories, maintenance equipment, workpieces, and other equipment incident to welding-type processes can render a work environment cluttered and disorganized. Ship building yards, in particular, are work sites in which thousands of welding machines, feeders, and other welding-type equipment are in use at one time.

Additionally, when welding-type equipment is not in use it may often be stored in several different designated places, be left sitting at a particular work space, or simply be returned to the wrong storage location. Ship building yards typically have multiple buildings in which welding-type equipment is stored, used, lost, and stolen on a daily basis. Further, it may be that multiple welding-type devices appear substantially identical. Therefore, it becomes difficult and time-consuming to locate welding-type equipment at large work sites and storage facilities. The time spent looking for a particular device, determining which individual last used the device, etc., can detract from the efficiency of an overall construction or manufacturing project.

Also, in situations where numerous welding-type devices are used, these devices may end up scattered across vast worksites, and thus become difficult to track or locate. The occurrence of theft thus increases. This can be particularly problematic for inverter-based welders and other lighter systems. Also, as a result of the vast size of ship building yards and other similar manufacturing sites, welding-type equipment may frequently be taken from the work site through various gates, unknown to and unauthorized by an owner. As such, when a work environment is disorganized and equipment is difficult to locate, a welding-type device could be missing for several days before an owner becomes aware that the device was stolen rather than merely misplaced or lost.

Welding-type devices also require periodic scheduled and unscheduled maintenance. Thus, maintenance personnel must be notified of new maintenance issues, the nature of the issues, the location of the device, and any helpful operating or maintenance history information to properly address the issues. In addition, maintenance records must be kept for each device, and maintenance personnel must be notified or otherwise keep track of when a scheduled maintenance task becomes due. Such scheduled maintenance tasks may include cleaning of various components, oiling of the device, replacement of regularly worn parts, or manually uploading system software upgrades or patches. Sometimes the same repair is needed on multiple machines and the time it takes to find the machines can actually exceed the time to do the repair or upgrade. If a maintenance crew cannot locate a device in a timely manner, a scheduled or unscheduled maintenance issue may be go unresolved and lead to damage to the device.

Other drawbacks of existing welding-type device inventory systems arise from the procedures by which device-specific information is kept. For example, records of the operations in which a device has been used, which operation a welding-type device is currently assigned to, which individuals have used a device, which individual is currently using a device, and when a device will next be available are often kept in a log book or database by a facilities or tools department. Details of the maintenance tasks that have been performed on a device and schedules of when preventive maintenance should be performed may be kept in logs or databases by the facilities or tools department, or by a maintenance department. Further, it is not uncommon for operator notes, technician notes, and known issues with equipment to be maintained by a variety of persons or departments within a firm. Typically, an operator's manual is minimally used to record past and future maintenance as well as operator notes, etc.

Manuals, log books, and other media are also not always easily locatable. These types of records could be kept at a number of locations, including with the device itself. Understandably, this does not aid in alerting owners or maintenance personnel of upcoming maintenance tasks. Additionally, a maintenance worker on a job site may not always remember to log information into a book or database when he or she returns to the department, or may find the recording of such information unnecessary. Furthermore, when these types of records are needed on site, they are not always easily located or available.

It would therefore be desirable to have a system for easily locating and keeping inventory of welding-type devices in use at a job site or at a storage facility. Furthermore, it would also be desirable if such system was also capable of providing information and notifications regarding past use and maintenance, current usage, scheduled preventive maintenance, and/or operator notes. It would also be desirable to monitor real-time operation and/or location of a device, machine, or accessory remotely.

BRIEF DESCRIPTION OF THE INVENTION

The present invention provides an apparatus and system for wirelessly locating, keeping inventory of, and communicating with welding-type devices that overcome the aforementioned drawbacks. A wireless communication unit capable of transmitting device information such as location and status is connected to a welding-type device to communicate such information to a monitoring unit or other welding-type devices. In this regard, real-time status of a welding-type device can be ascertained remotely.

Therefore in accordance with one aspect of the present invention, an apparatus is disclosed and includes a welding-type device, a data storage unit, and a wireless communication unit. The data storage unit is associated with the welding-type device and has identification information specific to the welding-type device stored thereon. The wireless communication unit is operationally attached to the data storage unit, and emits a signal carrying information from the data storage unit.

According to another aspect of the present invention, a wireless communication system for welding-type devices includes at least one remote monitoring device, at least one welding-type device, and at least one RF transmitter connected to the at least one welding-type devices. The at least one remote monitoring device is configured to receive signals emitted by the plurality of RF transmitters.

In accordance with another aspect of the present invention, a wireless communication kit for a welding-type device is disclosed, and includes a data storage unit, a processing unit, and a wireless transmitter. The data storage unit is configured for storing information specific to a welding-type device thereon. The processing unit is operably connected to the data storage unit and the wireless transmitter is connected to the processing unit and is configured to transmit the device-specific information from the data storage unit. The data storage unit, the processing unit, and the wireless transmitter are each associated with a specific welding-type device.

According to a further aspect of the present invention, a monitor is disclosed for supervising a welding-type device. The monitor includes a controller that wirelessly receives a signal encoded with operation information pertaining to a remote welding-type device. From this information, the controller determines a real-time operational status of the remote welding-type device.

In accordance with yet another aspect of the present invention, a method for manufacturing a welding-type wireless communication system is disclosed. The method includes configuring a plurality of welding-type devices to transmit wireless data signals containing at least a device-specific identifier and providing a monitoring device to receive the wireless data signals and determine location information for the plurality of welding-type devices therefrom.

In accordance with a further aspect of the present invention, a welding-type network is disclosed, having one or more processors. In this network, a wireless data signal is transmitted from a first node associated with a first welding-type device and received at a second node associated with either a second welding-type device or a monitoring apparatus. The second node determines an intended recipient identifier from the wireless data signal. When the intended recipient identifier matches the identifier for the second node, the wireless data signal is processed. If the intended recipient identifier does not match the identifier for the second node, the wireless data signal is relayed.

According to another aspect of the present invention, a system for coordinating maintenance of a welding-type device is disclosed. The system includes a data storage unit of a welding-type device, a transmitter, and a controller. The data storage unit stores a schedule of maintenance thereon. The controller identifies a scheduled maintenance task and causes the transmitter to wirelessly transmit a preventive maintenance notification signal to a remote receiver at a given time before the maintenance task is scheduled to be performed on the welding-type device.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the Drawings.

DETAILED DESCRIPTION OF THE PREFERRED EMBODIMENT

As one skilled in the art will fully appreciate, the hereinafter description of welders, welding accessories, welding devices, and welding systems also applies to the constituents of any system that requires high power outputs, such as heating and cutting systems. That is, the present invention is equivalently applicable with any device requiring high power output, including welders, plasma cutters, induction heaters, aircraft ground power units, and the like, as well as accessories and components thereof. Reference to welding power, welding-type power, or welders generally, includes welding, cutting, heating power, or ground power for aircraft. Description of a welding apparatus illustrates just one embodiment in which the present invention may be implemented.

Figure 1:
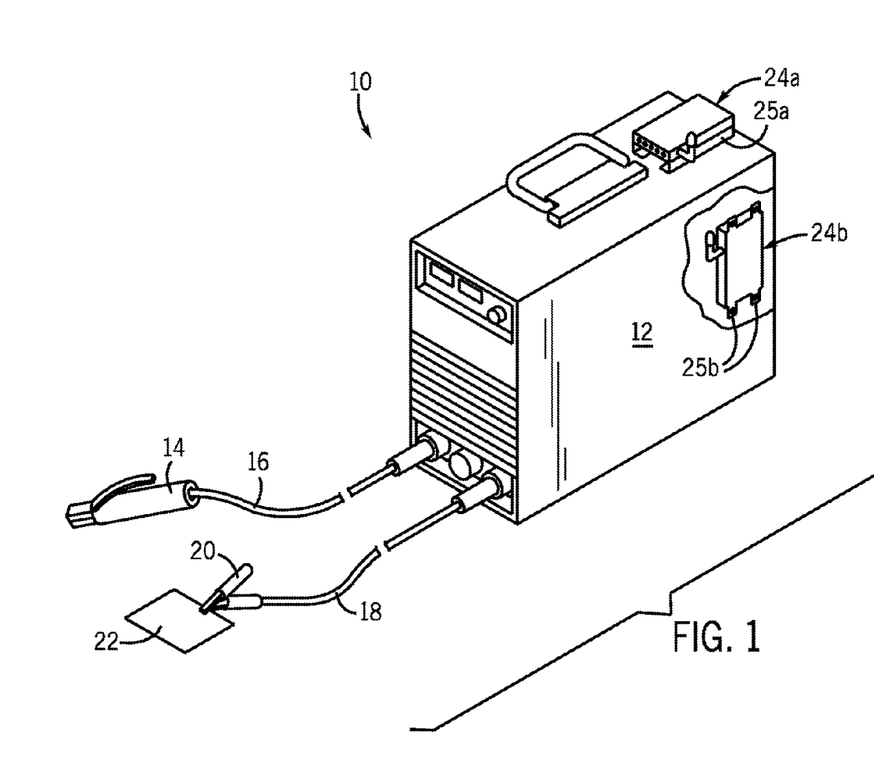
FIG. 1 is a perspective view of a welding-type apparatus in accordance with the present invention.

Referring to FIG. 1, a welding apparatus 10, in accordance with the present invention, is shown. As depicted, welding apparatus 10 includes a welding-type device such as a power source 12, although the present invention is not limited to welding-type power sources. Power source 12 is preferably constructed to receive an input power and generate an output suitable for welding. A torch 14 is operably connected to power source 12 via weld cable 16. Ground cable 18 attaches clamping member 20 to power source 12. Clamping member 20 is constructed to removably secure cable 18 to workpiece 22 so that a desired welding application may be performed. Wireless communication assembly 24 can be seen in break away view, 24b, attached inside power source 12 or optionally attached atop, 24a, an outer surface of power source 12. The desired position of wireless communication assembly 24 will depend upon the type of welding-type apparatus 10, the desired mode of wireless communication, and other design considerations. For example, wireless communication assembly 24 may operate as a radio frequency (RF) communication device, in which case it might be beneficial to dispose wireless communication assembly 24a outside power source 12 for increased range and better reception. Alternatively, in a preferred embodiment, wireless communication assembly 24b is disposed inside the housing of power source 12 for increased durability.

For example, wireless communication assembly 24 could operate as a common infrared communication device. In such a case, wireless communication assembly 24 could be disposed inside or outside a welding-type device so long as the infrared port (not shown) is capable of communication. Wireless communication assembly 24 could also operate as a sub-sonic or ultra-sonic device, in which case wireless communication assembly 24 could be disposed inside or outside a welding-type device. Likewise, if wireless communication assembly 24 were to operate as an optical or laser-type communication device, it could be disposed inside or outside a welding-type device so long as the optical communication port was exposed. From the hereinafter description of wireless communication assembly 24, it will be readily appreciated that a number of different modes of wireless communication may be suitable for use with the present invention.

In addition, it will be understood that the present invention is applicable to a multitude of welding-type devices. Not only is the present invention particularly useful in providing for wireless communication with a welding-type power source, the present invention also finds utility when extended to include other components of welding-type systems. Wire feeders, generators, weld guns and torches, advanced and user-adapted systems, accessories, and the like are all capable of being incorporated with the present invention. The phrase "welding-type device" shall include all devices useable in a welding system, including but not limited to welders, power sources, wire feeders, generators, weld guns and torches, advanced and user adapted systems, wire reels, accessories, and the like.

Figure 2:
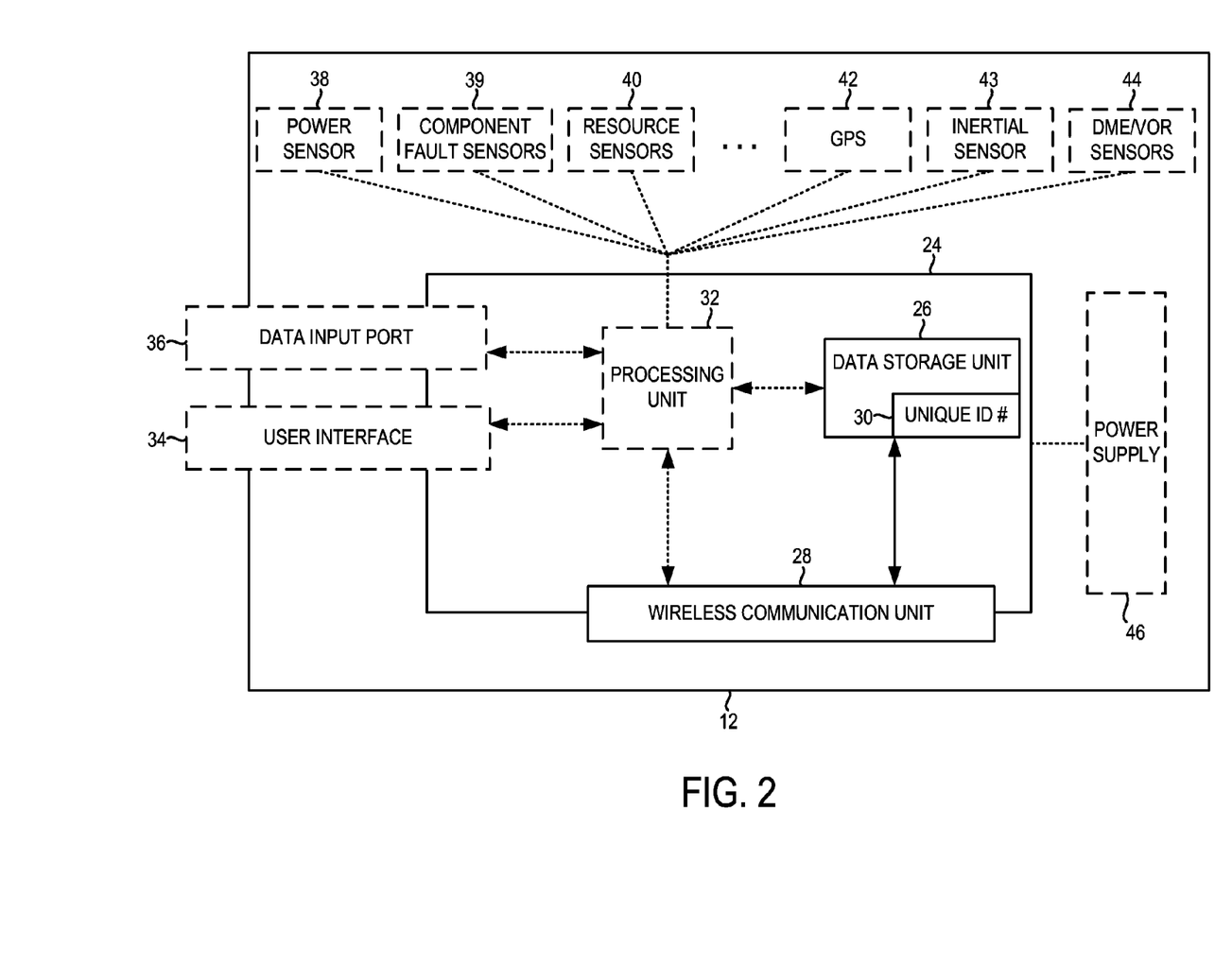
FIG. 2 is a schematic view of a wireless communication unit in accordance with the present invention.

Referring now to FIG. 2, a schematic view of wireless communication assembly 24 is shown. Wireless communication assembly 24 includes a data storage unit 26 and a transmitter or wireless communication unit 28. Wireless communication unit 28 and data storage unit 26 are connected for bidirectional data transfer, as shown. However, in certain embodiments, wireless communication unit 28 and data storage unit 26 may be only uni-directionally connected. Data storage unit 26 is conceptually shown as having at least a unique identification number 30 stored thereon. Processing unit 32, user interface 34, data input port 36, power sensor 38, component fault sensors 39, resource sensors 40, GPS device 42, inertial sensor 43, DME/VOR sensors 44, and power supply 46, shown in dashed lines, are optionally integrated into various embodiments.

Data storage unit 26 may be more than a simple memory device, and can include a configuration of electrical components which alter a received signal in a predetermined way. In such an embodiment, the original signal is modified by data storage unit 26, then reflected back to its source through wireless communication unit 28, in accordance with "passive" wireless communication. For example, a signal received by an RF antenna might be used to power the circuitry of data storage unit 26 to alter the load on the RF antenna, which could then be detected by the originator of the signal. In other words, data storage unit 26 and wireless communication unit 28 could be configured as a passive RFID tag. In other words, the "passive" RFID tag is one that does not require an internal power source. Alternatively, the tag may have its own power source. While both active RFID and passive RFID both use radio frequency energy to communicate between a tag and a reader, the way each tag is powered is different. Active RFID uses an internal power source (usually a battery) within the tag to continuously power the tag and its RF communication circuitry, whereas passive RFID relies on RF energy transferred from the reader to the tag to power the tag.

Alternatively, data storage unit 26 may be a more complex component, capable of storing and deleting digital data. Such a unit may include an integrated processor or microcontroller. In a preferred embodiment, data storage unit 26 is a digital storage device capable of having several types of information stored thereon, such as information specific to a welding apparatus and various message formats. That is, data storage unit 26 may be connected to several sources of data input and store various types of information therefrom. A data storage unit 26 may also be configured for rapid memory access, as when supplying a "real-time" data transfer. However, at a minimum, data storage unit 26 should be capable of providing identification information to wireless communication unit 28 for transmittal, such as a serial number, a unique identification code, system type information, or a network ID number. As mentioned above, it is contemplated that such identification information may be transmitted in various forms, such as a reflected signal alteration or a digital data-encapsulated wireless message.

Wireless communication unit 28 may include a transmitter, transponder, transceiver, or the like, depending upon the desired level of communication protocol complexity. That is, wireless communication unit 28 may be merely a transmitter capable of actively emitting signals, such as a beacon signal, but not necessarily configured to receive or recognize external signals. Or, wireless communication unit 28 may be a transponder emitting signals in a passive or active style, but only in response to received external signals. As described previously, wireless communication unit 28 may emit modified signal reflections as a response, but may also emit response signals generated entirely by wireless communication assembly 24. In addition, wireless communication unit 28 may comprise a transceiver capable of both responding to received signals and transmitting independently originated signals. Also as mentioned above, it is contemplated that wireless communication unit 28 may operate by transmitting and receiving RF signals, infrared signals, optical signals, or ultrasonic or subsonic signals.

It is also desirable to include a micro-controller, or processing unit 32 in wireless communication assembly 24. For example, a processing unit 32 may decode and identify received messages if a complex communication protocol is used. Further, if an appropriate response message is to be sent, based on some condition of the welding-type device for example, a processing unit 32 may request appropriate data from data storage unit 26, generate a data packet, and relay the message to wireless communication unit 28. Therefore, if a processing unit 32 is to be included in wireless communication assembly 24, then wireless communication unit 28 and data storage unit 26 should both be bi-directionally connected to processing unit 32. It is recognized, however, that a processing unit 32 may be unnecessary for a given wireless communication protocol.

Wireless communication assembly 24 may also include several types of sensors and interfaces configured for data input and output. These devices include a user interface 34, a data input port 36, a power sensor 38, various component fault sensors 39, various resource sensors 40, a GPS device 42, inertial sensors 43, and DME/VOR sensors 44, among others. User interface 34 may comprise an LCD display or LEDs for relaying messages to users, as well as a user input device such as command buttons or a numeric or alphanumeric keypad. Therefore, user interface 34 is shown as bi-directionally connected to processing unit 32. In this manner, when a user begins using a welding-type device, the user may be prompted to enter a user code so that current user information may be stored on data storage unit 26. Similarly, a user could enter operator notes or comments directly into user interface 34 to be stored on data storage unit 26. User interface 34 may also allow a user to view the data stored on data storage unit 26. However, it is also contemplated that user interface 34 may be a simple display panel that merely receives instructions from processing unit 32, but does not communicate bi-directionally.

The series of sensors and inputs 36-44 also are not required to be bi-directionally connected to processing unit 32. For example, it is envisioned that data input port 36 need not function as a bi-directional port, although a bi-directional port is contemplated. Data input port 36 may be used only to log information onto data storage unit 26 via processing unit 32, or data input port 36 may be used for full bi-directional communication with an external device such as a monitor device or a computer. In an alternative embodiment, data input port 36 and processing unit 32 may also be integrated with a welding-type device controller to update such stored functions as pulse sequences, user message displays and commands, and control limitations. That is, data input port 36 may operate as an updating module to receive system software upgrades or updates to be stored on data storage unit 26. The upgrades or updates could be used to update the system software of wireless communication assembly 24, a welding-type device controller, or both. Thus, a number of port types and protocols may be used to accomplish the aforementioned data storing or updating, such as serial ports, parallel ports, USB ports, and the like. Of course, one of ordinary skill in the art will appreciate that the same updating function may be equivalently performed via wireless communication unit 28.

Additionally, wireless communication assembly 24 may also be connected to operation status sensors 38-40. A power sensor 38 may be employed to notify processing unit 32 whether a welding-type device is "on" or "off", whether a torch or gun is operating or not, current battery level(s), and other operational conditions derived from sensed power levels. In addition, wireless communication assembly 24 may be connected to component fault sensors 39. A number of sensors 39 may be employed, each sensor 39 being individually configured to detect an operational error in a particular component of a welding-type device. Processing unit 32 could record summaries of the time or operating conditions under which errors occur onto data storage unit 26, and/or prepare real-time component error messages as soon as errors occur. Furthermore, other sensors 40 are used to detect current device resources, such as the amount of consumable wire remaining, the amount of remaining shielding gas, which accessories are attached to the device, and whether the accessories are compatible with the device's system type. Processing unit 32 could then calculate whether or when additional resources will be required based on recent usage data stored on data storage unit 26, or based upon predetermined minimum levels. Accordingly, summaries of operation status, continuous real-time operation status information, or automatic notifications of current or imminent errors and requirements may be transmitted via wireless communication unit 28.

In addition, wireless communication assembly 24 may also be connected to several types of location or tracking sensors 42-44. For example, in one embodiment, wireless communication assembly 24 may be connected to a GPS device 42. That is, a GPS device 42 may be integrated with wireless communication assembly 24 or its corresponding welding-type device to provide an absolute location reading. Such location information could then be forwarded to other welding-type devices, transmitted directly to a monitor device, or could be used to display position on user interface 34 of wireless communication assembly 24. It is further contemplated that an inertial sensor 43, preferably a MEMS-type sensor, may also be incorporated for relative tracking or position information, or to supplement other location sensors such as the GPS device 42. Also, DME (Distance Measuring Equipment) and VOR (Very high frequency Omni Ranging) sensors 44 may be employed to determine position information of a welding-type device relative to a monitoring device or radio tower. DME/VOR sensors 44 (such as radio antennas) determine how far an object is from a DME transmitter (not shown) and at what angle an object is from a VOR transmitter (not shown). Thus, the polar coordinates of a welding-type device could be determined relative to a monitoring device 48 or other device transmitting DME/VOR signals. In a similar fashion, a LORAN-type system (LOng RAnge Navigation) could be employed in larger work sites to determine the position of a given welding-type device. As known in the art, a LORAN system uses the time difference between receipt of a signal at two different stations to calculate a general position of a transmitter relative to the stations. Accordingly, monitoring devices 48 may measure the time at which a signal is received from a welding-type device to determine the device's location. In such an embodiment, wireless communication unit 28 is configured to emit a measurable LORAN-type signal. It is understood, however, that DME/VOR, GPS, and LORAN-type sensors and signals represent just some examples of location identifying techniques, and that other frequencies, topologies, and protocols are equivalently contemplated.

In some embodiments, wireless communication assembly 24 may also include an integrated power supply 46 to provide an operating voltage to the components of the wireless communication assembly 24. Power supply 46 may include a battery or other storage device suitable for providing an operating voltage. Alternatively, it may be more efficient or convenient to provide a connection for the wireless communication assembly 24 to receive power from a power source 12 or other device of a welding apparatus 10. Some welding-type devices may have their own internal power supplies, such as batteries or engines, while other devices may rely upon connection to a utility power or generator. In either case, power supply 46 could include a power conditioner to condition the welding-type power input into an appropriate operating input for wireless communication assembly 24. Also, power supply 46 could include a battery that is trickle-charged by a power source 12 or other welding-type device, when the power source or other welding-type device is on or in use. In addition to hardware concerns, various battery management techniques may be employed to conserve power. For example, wireless communication assembly 24 could operate in a low-power or "sleep" mode until receipt of a request signal, relay signal, or other signal which would necessitate a response or action of wireless communication assembly 24. Alternatively, wireless communication assembly 24 could be configured to only transmit or receive signals on an intermittent period, as opposed to receiving or transmitting signals at any time which could drain power.

A bracket 25 or other securing member is also contemplated for mounting or integrating the wireless communication assembly 24 with a particular welding-type device. As shown in FIG. 1, if wireless communication assembly 24b is to be integrated inside the housing of a power source 12, a series of tabs 25b or lips may be used to secure wireless communication assembly 24 to a surface inside a welding-type device. Alternatively, if wireless communication assembly 24a is to be mounted outside the housing of a welding-type device, a bracket 25a, also shown in FIG. 1, may be used. A bracket 25 which spaces wireless communication assembly 24 apart from a welding-type device may help improve signal quality, depending upon which mode of communication is adopted. In addition, wireless communication assembly 24 may take the form of a kit to retrofit existing welding-type devices, in which case, a bracket 25 or housing configured to secure and mount a wireless communication assembly 24 to a welding-type device is provided. Finally, if desired, it is contemplated that the bracket 25 or housing which mounts wireless communication assembly 24 may comprise a material which is useful in shielding wireless communication assembly 24 from stray signals or other interference which may emanate from a welding-type device.

In operation, wireless communication assembly 24 may be configured to communicate with other welding-type devices, monitoring devices, or both. The wireless communication assembly 24 of a first welding-type device may communicate signals directly to the wireless communication assembly 24 of a second welding-type device. Also, a monitoring device 48 may be provided which receives and transmits signals in direct communication with wireless communication assemblies 24 of one or more welding-type devices. In a preferred embodiment, both of these functions are incorporated in a mesh network architecture including device-device transmissions and device-monitor transmissions. In other words, a preferred embodiment of the present invention incorporates a mesh network topology and protocol.

Mesh networks are characterized by their lack of a center hub to which all nodes would normally be directly connected. Thus, to facilitate node-to-node communication, algorithms are used to determine the best data transmission path from an originator node to a recipient node. However, it is also contemplated that a "blind" message relay system may be employed. In the first instance, nodes periodically communicate with one another to determine which nodes are within transmission range of other nodes. In the later case, a node receiving a message intended for another node re-transmits the message to any other nodes in range rather than determining the most efficient data transmission route. This type of communication procedure may be more useful in smaller networks or in networks in which the paths from node to node are simple, known, or predetermined.

In a preferred embodiment, each mesh network data transmission of the present invention contains a source ID and a destination ID. The destination ID informs nodes that receive the transmission of its intended recipient. If the receiving node is the recipient, the message is decoded and processed. If the receiving node is not the intended recipient, the message is relayed to other nodes. The source ID is used to direct response messages, when a response message is required.

As discussed previously, a wireless communication assembly 24 may be powered primarily by the welding-type device to which it is connected, when the device is in operation, and a battery or other integrated power supply 46 when the device is off. Therefore, to locate, detect, or communicate with a welding-type device that is not in operation would require the wireless communication assembly 24 of such welding-type device to transmit signals from battery power alone. One of ordinary skill in the art will recognize that transmission range of wireless signals is often directly related to power consumption. As such, transmitting a signal from a welding-type device directly to a distant monitoring device 48 will consume more power than transmitting the signal to another welding-type device which is closer. Therefore, by employing a mesh network, the need to transmit wireless signals over potentially longer distances is eliminated and power consumption is reduced.

Additionally, the use of a mesh network allows for wireless communication assemblies to be disposed inside welding-type devices without increasing required power consumption. A metal outer housing of a welding-type device can create a high signal attenuation, which must be overcome by using higher power signals or forming gaps in the housing. However, when using shorter transmission distances, such as in a mesh network topology, the higher attenuation rate of a device housing becomes a less significant factor, and power consumption can remain relatively lower. While a mesh network topology has recognizable benefits, one of ordinary skill in the art will also understand that other network topologies are equivalently applicable, such as a traditional "star-shaped" network topology, or distributed or "tree" network topologies. Also, the use of repeater units and/or signal boosters can aid in overcoming transmission hindrances in any network topology, especially when welding-type devices are located in areas which create a high degree of signal attenuation, such as in the hulls of ships.

The signals or messages emitted by the wireless communication assembly 24 may contain several types of location or identification information. These signals or messages may be transmitted autonomously, or in response to location or identification request signals. Regardless of the desired response signal format, each transmission of wireless communication assembly 24 can at least relate identification information specific to the corresponding welding-type device. Identification information can include a device-specific code or identifier such as a serial number or a user-defined identification number. More complex forms of transmittable identification information include ownership information, serial numbers, current users, system type, and network IDs. In addition, any signal that a wireless communication assembly 24 emits containing a device specific identifier may be used to locate the wireless communication assembly 24 and its corresponding welding-type device. That is, directional antennas, triangulation, and simple honing techniques could be employed by the user of a monitoring device 48 to find a transmitting welding-type device, even though no particular location data is encoded in the signal. However, a location signal could also include more particularized location information, such as GPS data, relative DME/VOR position information, LORAN signals, inertial location information, and the like.

In addition to merely locating a particular device, identification information may also be useful when preparing to perform a welding-type process. When a user desires to find components which are needed to operate a welding-type apparatus, the user could use a monitoring device 48 to send a system-type identification request. Based upon the system-type identification information stored on data storage unit 26, wireless communication assembly 24 may respond with a location and/or identification signal upon receiving such a request so that a user can easily locate only the type of devices which are desired. For example, if a user wished to prepare for a plasma cutting process, the user could send a plasma cutting system identification request via monitoring device 48. All plasma cutting power supplies, torches, and other related equipment in the vicinity would then respond with a location and/or identification signal. Monitoring device 48 would then direct the user as to which types of plasma cutting equipment are nearby, and where each of those devices is generally or specifically located. One of ordinary skill in the art will recognize that variations of the system type identification request signal are possible, and that any desired level of specificity may be used in the locating criteria.

Wireless communication assembly 24 may also transmit device-specific operation information received from sensors 38-40 and/or logged onto the data storage unit 26 by a data input device 28, 34, 36. The operation information may be transmitted autonomously, or in response to operation or status request signals. Operation information received from sensors 38-40 includes information such as whether the device is on or off, whether it is currently being used, current device resources, existing and imminent operational problems, and real-time operational status information. Operation information logged onto data storage unit 26 from external sources may include current software versions, a history of usage, a history of maintenance that has been performed in the past, a schedule of preventive maintenance to be performed in the future, an employee ID of the current user, the current project, job site, or operation to which the device is assigned, or operator comments and notes. Such information may be logged onto data storage unit 26 via wireless communication unit 28, user interface 34, or data input port 36. As mentioned above, operation information may be transmitted in a summary form or in a real-time format, and may be transmitted independently or upon request.

Figure 3:
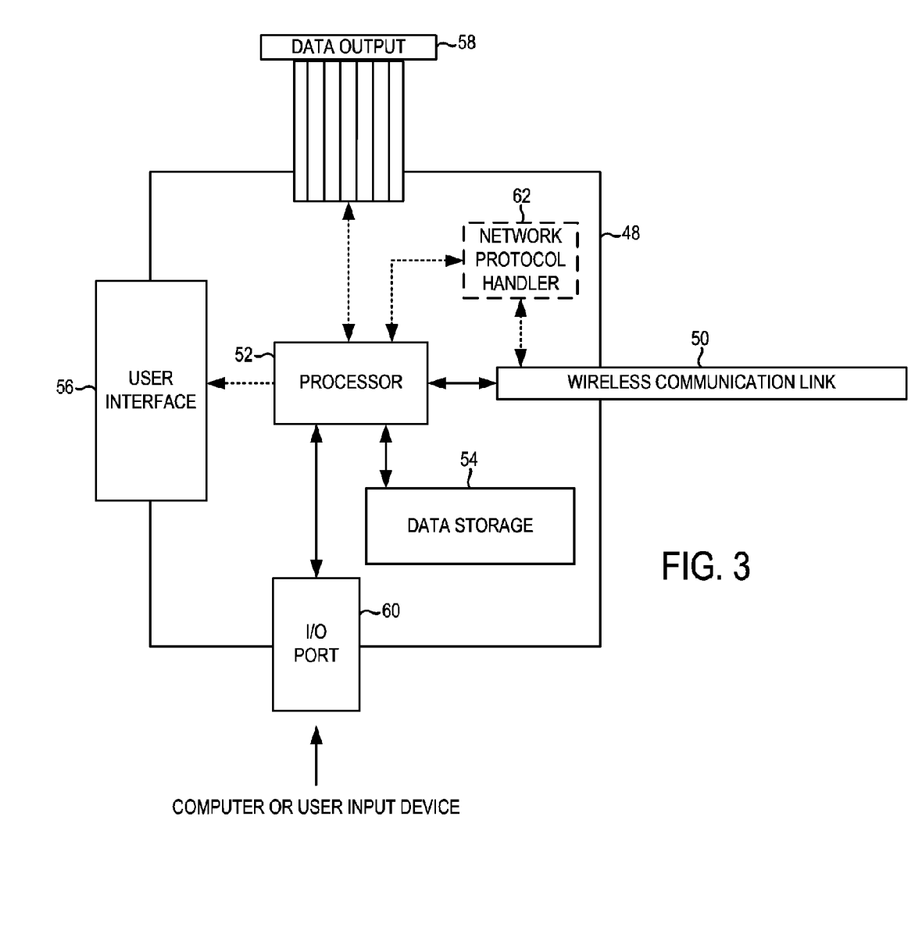
FIG. 3 is a schematic view of a monitoring device in accordance with the present invention.

Referring now to FIG. 3, a schematic view of one embodiment of a monitoring device is shown. It is contemplated that monitoring device 48 may be constructed as a hand-held device, a portable device akin to a laptop computer, or a desktop or permanent station. Understandably, however, other suitable configurations could exist, such as user-adapted or user-specific configurations. Depending upon the desired features of a wireless system according to the present invention, portability of the monitoring device 48 will be beneficial. For example, if welding-type devices are to be located by directional antenna or honing, it may be more beneficial to use a monitoring device 48 configured as a handheld device. However, if monitoring device 48 is to be used to detect arrivals and departures of welding-type devices from a job site, it may be more beneficial for monitoring device 48 to be configured as a station. Regardless, it is recognized that monitoring devices 48 incorporating any of these configurations will still be inter-compatible since all configurations are capable of operating in any of the herein described network protocols.

As with the wireless communication assembly 24 discussed above, monitoring device 48 may operate on a number of different modes of wireless communication. As such, wireless communication link 50 may be configured for RF, infrared, optical, sub-sonic, or ultra-sonic communication. In a preferred embodiment, wireless communication link 50 includes a directional RF antenna, exhibiting a special gain in a specified radial direction from the monitoring device 48. In such a manner, wireless communication link 50 receives signals sent from any direction while able to detect the direction from which a given signal is being transmitted. In another embodiment, wireless communication link 50 includes both a directional antenna and an omni-directional antenna, to maximize directional gain while maintaining adequate omni-directional receiving capabilities.

Monitoring device 48 transmits signals to the wireless communication assemblies 24 of welding-type devices. The communications which are transmitted by monitoring device 48 to a welding type device may instruct welding-type devices to relay a message to other welding-type devices, request welding-type devices to respond with location information, status information, or operation information, or may instruct welding-type devices to log a preventive maintenance schedule, update system functions and software, or store operator notes. However, there are also circumstances in which a monitoring device 48 transmits messages to other monitoring devices 48. For example, monitoring devices 48 will communicate with one another when a welding-type device is being located through triangulation and when a mesh network is employed.

Likewise, monitoring device 48 will receive signals from welding-type devices, but may also receive signals from other monitoring devices 48. In operation, wireless communication link 50 receives signals from welding-type devices or other monitoring devices 48, and communicates them to processor 52. Processor 52 then decodes and recognizes the received signals and acts accordingly. In most situations upon receiving a signal from a welding-type device, processor 52 will instruct wireless communication link 50 to relay a received signal to another monitoring device 48 (as in a mesh network system) or will process the decoded data and instruct data storage 54 to store it.

However, wireless communication link 50 is not the only means of data input or output available to monitoring device 48. Specifically, data output port 58 and I/O port 60 also provide monitoring device 48 with the capability to communicate with other devices. Data output port 58 is preferably configured to log information from monitoring device 48 to a wireless communication assembly 24. For example, monitoring device 48 may be used to log operator notes, maintenance schedules, or usage history, or to update device functions on a welding-type device via data output port 58. I/O port 60, on the other hand, is configured for bi-directional communication and may be a serial port, parallel port, USB port, or any other suitable type of data communication port for transferring information between monitoring device 48 and a PC or user input device. That is, I/O port 60 may be configured to connect peripheral devices to monitoring device 48, or may be used for transferring data from monitoring device 48 to a PC or base station. Monitoring device 48 may also be equipped with its own user interface 56, such as an LCD display, to show menus and other graphical or textual messages to a user, or to display a map or directional indicator for locating welding-type devices.

If a centralized network is employed, one or more monitoring devices 48 may function as a centralized hub or server (distributed or individual) of the network, as in a "star" topology. Therefore, monitoring device 48 is optionally provided with network protocol hander 62. That is, if all messages and signals from welding-type devices are to be transmitted only to a monitoring device 48, a network handler 62 is integrated into monitoring device 48 to route and organize network data traffic. One of ordinary skill in the art will recognize that the proper type of network handler 62 to be used will depend upon desired network characteristics such as the number of nodes, whether common data storage access is to be used, and whether multiple network hubs are employed. Additionally, if a "tree" network is desired, one or more monitoring devices 48 or welding-type devices may operate as central nodes or hubs. In certain circumstances, it may be beneficial to select welding-type devices having greater power capabilities to operate as "branch" hubs, and one or more monitoring devices 48 to operate as centralized primary hub. In such a manner, devices having lower power capabilities need only transmit messages as far as a local branch hub to conserve power. The branch hub could, in turn, repeat or re-transmit the message to a more distant primary node. Likewise, repeater units or signal boosters could be employed to further aid in long distance transmission from devices having limited power capabilities.

Figure 4:
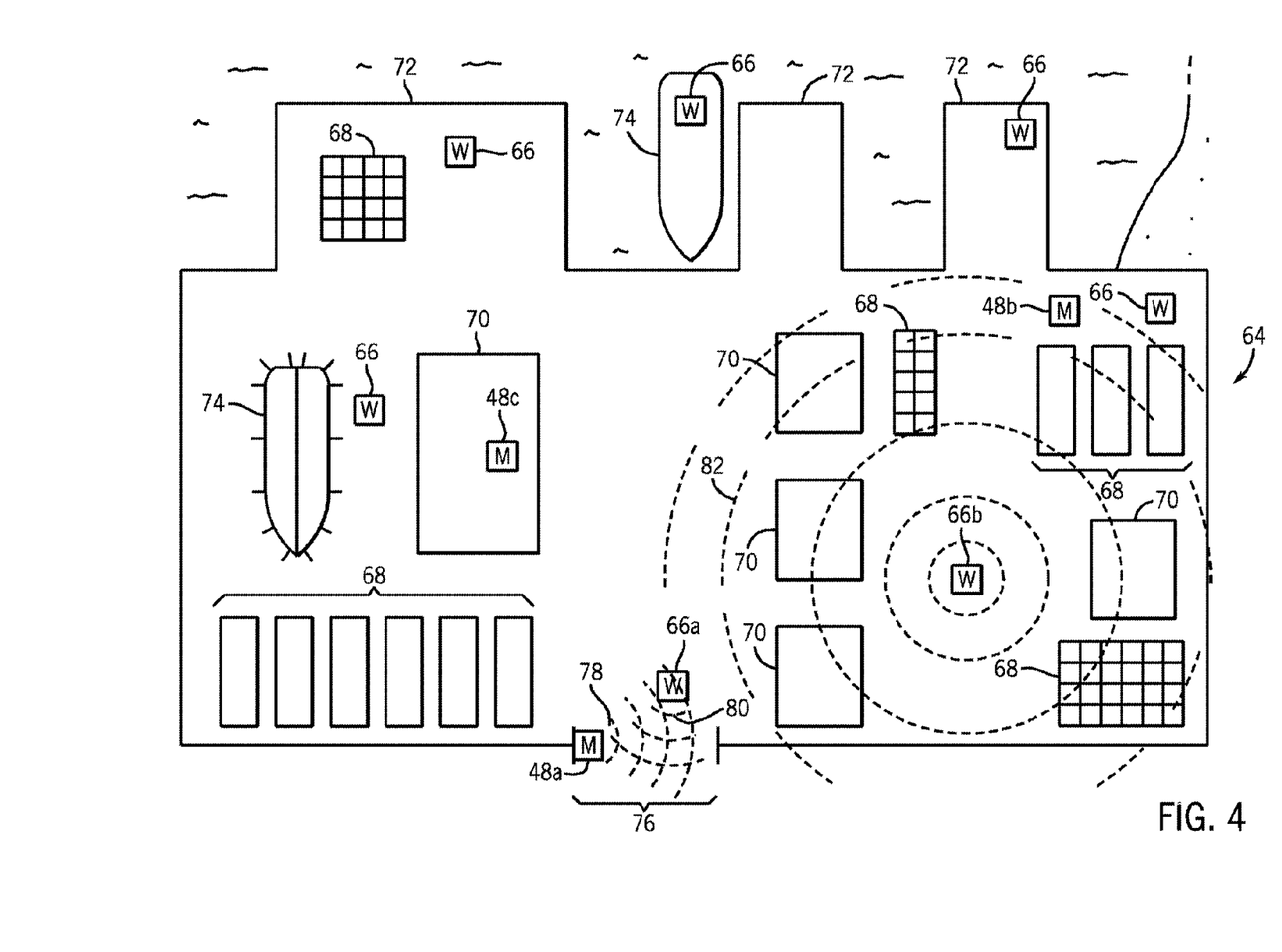
FIG. 4 is a schematic view of welding-type devices and monitoring devices in accordance with an aspect of the present invention.

Referring now to FIGS. 4-7, several features and functions of the present invention are shown. In particular, FIG. 4 depicts a welding communication system in accordance with the present invention in use at a shipyard 64. Shipyard 64 contains a multitude of shipping crates 68, buildings 70, docks or piers 72, ships 74 being constructed, monitoring devices 48, and welding-type devices 66. Monitoring device 48a, welding-type device 66a, and gate area 76 illustrate one theft prevention feature of the present invention. Monitoring device 48a emits a constant identification request signal 78, which must extend over only a short range, as shown. Thus, when a welding-type device 66a reaches gate area 76, welding-type device 66a receives the identification request signal 78 from monitoring device 48a and responds with a signal 80 containing the unique identification number of welding-type device 66a. Welding-type device 66a may be in either a fully operating or low-power "sleep" state and will still receive the identification request signal 78 and respond. Monitoring device 48a then alerts a user that a welding-type device 66a is leaving the premises. However, it is also understood that monitoring device 48a could act passively and merely detect signals initiated by welding-type device 66a. Alternatively, a welding-type device, such as 66b, may emit a periodic beacon signal 82 which extends over a wide range of a job site 64. Monitoring devices 48b and 48c are evenly positioned over shipyard 64, such that any welding-type device 66 located therein will be within range of at least one monitoring device 48. As such, when no monitoring devices 48, detect a beacon signal from a particular welding-type device 66b, a user may be alerted that the particular welding-type device 66b is missing, has stopped functioning, or otherwise requires attention. In either of these embodiments, theft prevention may be achieved by storing a schedule of authorized departures in data storage 54 of one or more monitoring devices 48. Thus, if an unauthorized departure occurs, security or loss-prevention personnel may be alerted.

Figure 5:
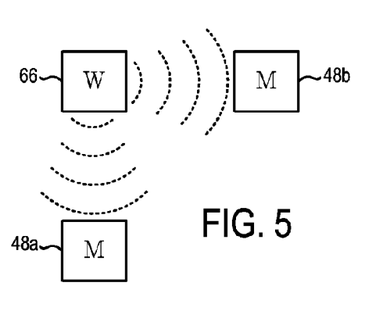
FIG. 5 is a schematic view of a welding-type device and monitoring devices in accordance with another aspect of the present invention.

FIG. 5 illustrates how a welding-type device 66 may be located by one or more monitoring devices 48. First, welding-type device 66 may transmit an omni-directional beacon signal, which is detected by a monitoring device 48a. Monitoring device 48a could then hone in on the position of welding-type device 66 through the use of a directional antenna. Alternatively, if the beacon signal were to reach more than one monitoring device 48a, 48b equipped with a directional antenna, the monitoring devices 48a, 48b could locate the position of welding-type device 66 through triangulation. Furthermore, in embodiments in which the wireless communication device 24 of a welding-type device 66 is equipped with integrated location sensors 42-44, such as a GPS device 42, an inertial sensor 43, or DME/VOR equipment 44, either or both of monitoring devices 48a, 48b could transmit a location request signal and receive location information from the welding-type device 66 in a location response signal.

Figure 6:
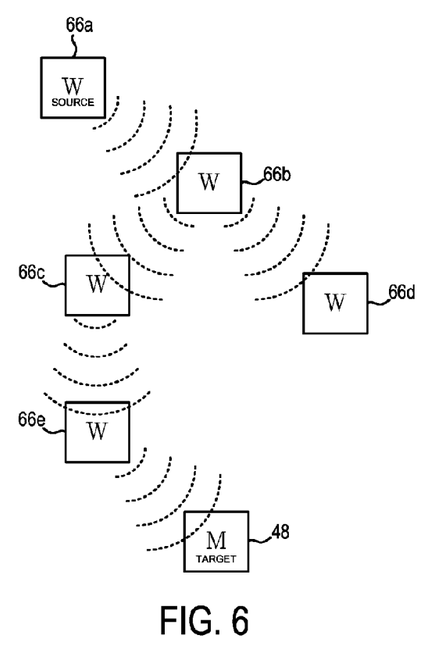
FIG. 6 is a schematic view of welding-type devices and a monitoring device in accordance with yet another aspect of present invention.

Referring now to FIG. 6, an example of a communication path of a mesh network is shown. As depicted, welding-type device 66a originates a message signal intended for monitoring device 48, the signal containing both the unique identification number of monitoring device 48 and message data. However, welding-type device 66a transmits a message signal without enough range to reach monitoring device 48, the intended recipient. Therefore, welding-type device 66b receives the message and relays it to other welding-type devices 66c, 66d in the vicinity. Welding-type device 66c then relays the message to welding-type device 66e, which is within the transmission range of welding-type device 66c. Welding-type device 66e, in transmission range of monitoring device 48, then relays the message to its intended recipient. In an alternative embodiment, wireless communication assembly 24 of welding-type device 66a could compute the most efficient or shortest transmission path to its intended recipient, monitoring device 48, and formatted its message signal to be relayed accordingly. Thus, welding-type device 66d would not have received or would not have read the message signal.

Figure 7:
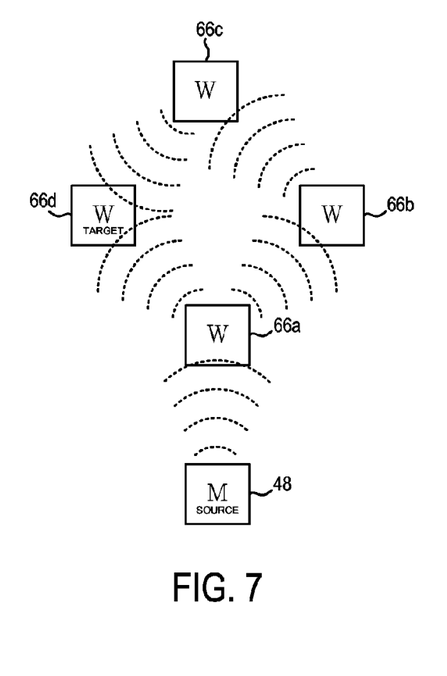
FIG. 7 is a schematic view of welding-type devices and a monitoring device in accordance with a further aspect of present invention.

FIG. 7 shows an example of mesh network communication in the opposite direction. Monitoring device 48 is not in transmission range of its intended message recipient, welding-type device 66d. Thus, monitoring device 48 transmits a message signal containing the unique identification number of welding-type device 66d, and message data, to the welding-type device 66a within transmission range. In one embodiment, welding-type device 66a then relays the signal to any other welding-type devices 66b, 66d within transmission range. The transmitted message signal reaches both welding-type device 66d and welding-type device 66b. However, welding-type device 66b is not in range of welding-type device 66d and continues to relay the message through welding-type device 66c to reach welding-type device 66d. One of ordinary skill in the art will recognize that this method may be more desirable for systems having a small number of nodes, nodes using inexpensive, non-complex wireless communication assemblies, or nodes positioned in a known or predetermined arrangement. In an alternate embodiment, wireless communication assembly 24 of welding-type device 66a determines the shortest transmission path to the target welding-type device 66d and transmits a signal to travel accordingly. That is, processing unit 52 of monitoring device 48 utilizes a series of algorithms to determine the shortest and most efficient transmission path to an intended recipient and transmits a message containing the unique identification numbers of the welding-type devices 66 in the communication chain, thereby reducing overall network traffic.

Accordingly, it has been shown that the present invention provides a flexible and adaptable wireless communication system for welding-type devices. The present invention is particularly useful in locating and maintaining an inventory of welding-type devices, in preventing theft and misplacement of devices, and in organizing maintenance and resource distribution.

Therefore, an apparatus is provided having a welding-type device, a data storage unit associated with the welding-type device, and a wireless communication unit operably attached to the data storage unit. The wireless communication unit is configured to emit a signal carrying information stored on the data storage unit, such as identification information.

The present invention also includes a wireless communication system for welding-type devices including a plurality of welding-type devices, a plurality of RF transmitters, and at least one remote monitoring device. The plurality of RF transmitters is configured to emit signals which are received by the remote monitoring device.

A kit is also provided for a welding-type device having a data storage unit, a processing unit operably connected to the data storage unit, and a wireless transmitter connected to the processing unit, all associated with a specific welding-type device. The data storage unit is configured to store device-specific information of a welding-type thereon which is transmitted by the wireless transmitter.

A method for manufacturing a welding-type wireless communication system includes configuring a plurality of welding-type devices to transmit wireless data signals, and providing a monitoring device to receive the signals therefrom. The wireless data signals contain at least a device-specific identifier. The monitoring device determines location information for the welding-type device from the received signals.

A monitor for supervising a welding-type device is also provided. The monitor includes a controller that is configured to wirelessly receive a signal encoded with operation information of a remote welding-type device and determine a real-time operational status therefrom.

In addition, the present invention also includes a welding-type network having one or more processors. The welding-type network and the processors thereof cause a wireless data signal to be transmitted from a first node associated with a first welding-type device. A second node associated with a second welding-type device or a monitoring node receives the wireless data signal and determines an intended recipient identifier therefrom. If the intended recipient identifier matches the identifier of the second node, the signal is process. If not, the second node will relay the wireless data signal.

The present invention also includes a system for coordinating maintenance of a welding-type device. The system includes a data storage unit of a welding-type device, a transmitter, and a controller. The data storage unit is configured to store a schedule of maintenance. The transmitter is configured to wirelessly transmit a preventive maintenance notification signal to a remote receiver. The controller identifies a scheduled maintenance task and causes the transmitter to transmit this preventive maintenance notification signal before the maintenance task is scheduled to be performed on the welding-type device.

The present invention has been described in terms of the preferred embodiment, and it is recognized that equivalents, alternatives, and modifications, aside from those expressly stated, are possible and within the scope of the appending claims.

What is claimed is:

1. An apparatus comprising:
   a welding-type device;
   a data storage unit associated with the welding-type device and storing identification information of the welding-type device, system type information relating to a system type of the welding-type device, and location information of the welding-type device within a network stored thereon, wherein the location information comprises data that enables determination of a physical location of the welding-type device, wherein the system type information comprises a welding-type process the welding-type device is configured to perform;
   one or more sensors configured to provide operational status information of the welding-type device, wherein the operational status information indicates whether the welding-type device is on or off, whether the welding-type device is operating or not, a power level of the welding-type device, an operational error of the welding-type device, or resource information relating to statuses of resources associated with the welding-type device; and
   a wireless communication unit operationally attached to the data storage unit, the wireless communication unit configured to receive a system-type identification request from a monitoring device, to determine whether the welding-type device is configured to perform a specific welding-type process based at least in part on the system type information stored in the data storage unit, and to emit a signal carrying the identification information, the location information, and the operational status information in response to the system-type identification request received from the monitoring device, wherein the system-type identification request represents a query for welding-type devices configured to perform the specific welding-type process, and the wireless communication unit emits the signal only if the welding-type device is determined to be configured to perform the specific welding-type process.

2. The apparatus of claim 1 wherein the wireless communication unit is configured to periodically emit a beacon signal containing the identification information and the location information.

3. The apparatus of claim 1 wherein the identification information further comprises a unique ID number, an ownership identifier, or a system identifier.

4. The apparatus of claim 1 wherein the wireless communication unit is further configured to receive signals and emit corresponding response signals.

5. The apparatus of claim 4 wherein the wireless communication unit is configured to emit a signal containing the operational status information upon receiving a status request signal and to emit a signal containing identification information upon receiving a location request signal.

6. The apparatus of claim 1 further comprising a plurality of sensors and interfaces connected to the data storage unit and configured to upload system software upgrades and input operation information including at least one of a history of usage, a history of maintenance performed, a schedule of preventive maintenance, existing and imminent operational problems, current device resources, real-time operation status, or operator notes to the data storage unit.

7. The apparatus of claim 1 wherein the data storage unit and the wireless communication unit comprise an active or a passive RFID device.

8. The apparatus of claim 1 wherein the wireless communication unit communicates by at least one of RF signals, infrared signals, optical signals, sub-sonic signals, or ultra-sonic signals.

9. The apparatus of claim 1 wherein the network is a mesh network comprising at least one other welding-type device and at least one monitoring device so as to relay signals across the network, thereby extending a range of the network.

10. The apparatus of claim 1 wherein at least one of the data storage unit or the wireless communication unit is disposed in the welding-type device.

11. The apparatus of claim 1 wherein at least one of the data storage unit or the wireless communication unit is affixed to an outer surface of the welding-type device.

12. The apparatus of claim 1, wherein the data comprises GPS data, DME/VOR data, or LORAN data.

13. The apparatus of claim 1, wherein the data comprises an absolute location of the welding-type device.

14. The apparatus of claim 1, wherein the system type information for the welding-type device specifies whether the welding-type device is configured to perform a welding process, a plasma cutting process, or an induction heating process.

15. The apparatus of claim 1, wherein the system-type identification request represents a query for welding-type devices configured to perform a welding process, a plasma cutting process, or an induction heating process.

16. The apparatus of claim 1, wherein the data storage unit stores the resource information relating to the statuses of the resources associated with the welding-type device.

17. The apparatus of claim 16, wherein the resource information includes information relating to an amount of remaining shielding gas, a list of accessories attached to the welding-type device, or whether the accessories are compatible with the system type of the welding-type device.

18. The apparatus of claim 16, wherein the wireless communication unit is configured to emit the signal carrying the resource information from the data storage unit in response to the system-type identification request.

19. The apparatus of claim 16, wherein the wireless communication unit is configured to emit the signal carrying information relating to when additional resources will be required based on the resource information in response to the system-type identification request.

* * * * *